United States Patent [19]

Robinson

[11] 3,737,852

[45] June 5, 1973

[54] PATTERN RECOGNITION SYSTEMS USING ASSOCIATIVE MEMORIES

[75] Inventor: Thomas E. Robinson, Hampshire, England

[73] Assignee: International Business Machines Corporation, Armonk, N.Y.

[22] Filed: Mar. 8, 1971

[21] Appl. No.: 121,667

[52] U.S. Cl. ..................340/146.3 Q, 340/146.3 WD

[51] Int. Cl. ..................G06k 9/00

[58] Field of Search .........340/146.3 WD, 146.3 MA, 340/146.3 Q, 146.3 AG

[56] References Cited

UNITED STATES PATENTS

| | | | |
|---|---|---|---|
| 3,573,730 | 4/1971 | Andrews et al. | 340/146.3 Q |
| 3,582,884 | 6/1971 | Shepard | 340/146.3 H |
| 3,104,372 | 9/1963 | Rabinow et al. | 340/146.3 AG |
| 3,166,743 | 1/1965 | Greenwald | 340/146.3 AG |
| 3,588,822 | 6/1971 | Shinski Yamamoto | 340/146.3 J |
| 3,576,534 | 4/1971 | Steinberger | 340/146.3 Q |

*Primary Examiner*—Maynard R. Wilbur
*Assistant Examiner*—Joseph M. Thesz, Jr.
*Attorney*—Hanifin & Jancin and J. Michael Anglin

[57] ABSTRACT

In a pattern recognition system, a pattern is either presented as a bit string or is transduced to the form of a bit string. An associative store cycles to select different sections of the bit string for application to a data bus to which is connected a plurality of associative stores for both data input and data output. The bit string sections are processed in each store of the plurality of associative stores against tables located in the store to locate either matched words or completely matched tables resulting in a bit pattern gated onto the data bus identifying the pattern, representing the information content of the pattern or signifying that the pattern is one which the system cannot recognize.

17 Claims, 4 Drawing Figures

INVENTOR
THOMAS E. ROBINSON
BY

PATTERN RECOGNITION SYSTEMS USING ASSOCIATIVE MEMORIES

SUMMARY OF THE INVENTION

The present invention relates to pattern recognition systems such as, for example, the optical character readers described hereinafter as embodiments of the invention.

The present invention provides a pattern recognition system comprising input means for reducing an input pattern into the form of a bit string, a plurality of associative memory units having their inputs connected in parallel to the output of the input means arranged to respond if the bit string conforms to words or combinations of the words stored in the memories, and output means connected to the output of the associative memories for producing output signals representative of patterns determined by the outputs of the associative memories.

Preferably each associative memory is of the form of a functional memory unit of the kind disclosed in U.S. Pat. No. 3,609,702 to P. A. E. Gardner et al.

Such a pattern recognition system has the advantages that the patterns it can recognize can be readily altered by reloading the associative memories, the patterns it can recognize can be extended by increasing the number of associative memories without appreciably disturbing the system or increasing its response time, the system can be produced in substantially uniform circuitry which, in modern technologies, lends itself to ease of manufacture and can be checked, if desired, by a memory test rather than a recognition system test.

BRIEF DESCRIPTION OF THE DRAWING

The present invention will be described further by way of example with reference to various embodiments thereof as illustrated in the accompanying drawings in which.

DETAILED DESCRIPTION OF THE SYSTEM

Figure 1:
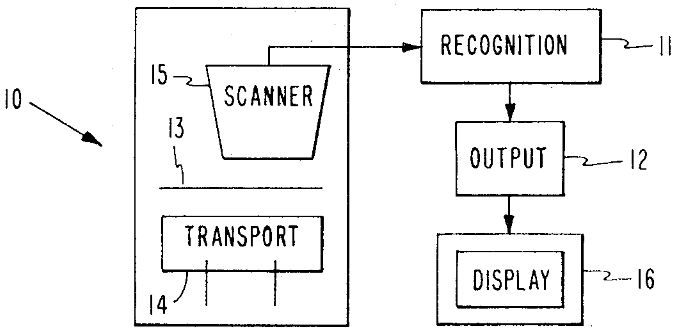
FIG. 1 is a diagram of a basic optical character reader provided for purely explanatory purposes.

An optical character reader is perhaps the most commonly used form of pattern recognition system and the basic form of an optical character reader is shown in FIG. 1. It will be seen that such a reader comprises three main stages:

a. an input stage 10;

b. a recognition stage 11; and c. an output stage 12.

The input stage 10 is used to reduce an input pattern, i.e., a character presented as part of a document 13 on a document transport 14, to a form that can be handled by the recognition stage 11. Thus the input stage will normally include a scanning transducer 15, such as a flying spot scanner having a simple vertical raster, producing a signal string representative of the character scanned, the signal form being significant to the recognition stage so that, if the recognition stage is of digital electrical form, the signal string will be of digital electrical form.

The recognition stage 11 processes the signal string by comparison or processing according to some algorithm or a combination of the two until a particular preset form is observed. Failure to observe such a form means that the reader is not equipped to recognize that character or that the system has malfunctioned.

The output stage 12 normally transduces the response of the recognition stage 11 to a signal string into a usable form such as a machine readable code or instructions to control a display device 16 (as shown).

It will be apparent that this way of representing a character reader is somewhat arbitrary and that the division of the three stages does not have to be as clearly defined as is suggested by the foregoing description. Nevertheless, the description will serve to show that the input and output stages are dependent on the recognition stage and are substantially of conventional form. The essence of the present invention lies in the nature of the recognition stage and the following descriptions of embodiments of the invention will be limited to matters which relate solely to the recognition stages of the optical character readers concerned. In each case the recognition unit is of digital electrical form requiring an input in the form of a bit string and so the output of the input stage is arranged accordingly.

Figure 2:
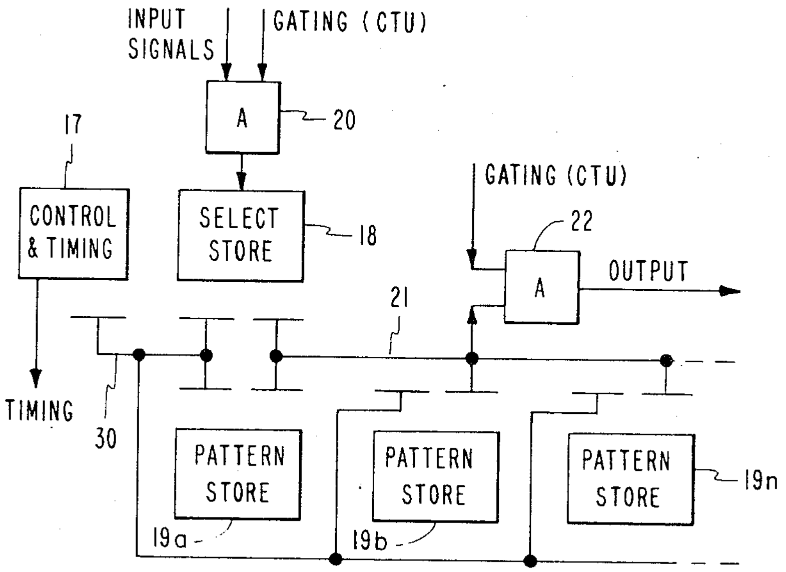
FIG. 2 is a diagram of one form of optical character reader according to the present invention.

The recognition stage shown in FIG. 2 comprises a control and timing unit (CTU) 17, a select store 18 and pattern stores 19*a*, 19*b*, . . . 19*n*. The bit string is entered into the select store 18 through an AND gate 20 receiving gating signals from the CTU 17. All or selected parts of the bit string are supplied by the select store 18 under control of the CTU 17 to a common data bus 21 and thence to each of the pattern stores 19*a*, 19*b* . . . 19*n* which are in turn controlled by the CTU 17. Each pattern store 19*a*, 19*b*, . . . 19*n* can read out data onto the common data bus 21 which also outputs through an AND gate 22 controlled by gating signals from the CTU 17.

Each store 18, 19*a*, 19*b*, . . . 19*n* is a functional memory unit of the kind disclosed in the specification hereinbefore referred to so that the control exercised on these stores by the CTU 17 is by way of timing signals and by way of control keys (the data paths 30 for the control keys being shown but most of the timing signal lines being omitted from the drawings). The CTU 17 is a combination of a conventional read-only store with a clocking system. In crude terms, each store 19*a*, 19*b*, . . . 19*n* contains within it bit patterns which are significant of patterns which the system is set up to recognize. Each data group fed onto the common data bus 21 from the store 18 is compared with the patterns stored in each of the stores 19*a*, 19*b*, . . . 19*n* and when the input string is exhausted, the stores 19*a*, 19*b*, . . . 19*n* are caused to read out data, addressed by input data groups which have found a match in the store, onto the common data bus 21 and out of the recognition stage through the AND gate 22. Considering the operation of the recognition stage of FIG. 2 in detail, the function of the store 18 is to pass to the common data bus 21 various bit patterns selected from the bit string supplied to the store together with a key showing which kind of bit pattern is being transmitted. This function is accomplished by the following operations:

a. The bit string is accumulated in the word selectors of the store 18 by entering each serially arriving bit onto the NEXT line of the store. This bit is entered into the word selectors at the end of the bits already entered by a NEXT operation which causes the word selectors to function as a shift register so that each bit, in its own relative position, passes once through the word selectors and is discarded;

b. predetermined labels stored in store 18 are used under the control of the control keys from the CTU 17 to enter onto the common data bus 21 the bits from certain bit positions of the word selectors. The control keys cause the contents of the word selectors to be entered into the store, a table to be selected and one or more patterns to be selected by an associative search using the control key and the bit patterns to address the table, the results to be gated out onto the common data bus 21 together with the appropriate control key and the bit pattern to be returned to the word selectors. This operation is repeated until the bit string is exhausted and involves one preset sequence of control keys which is embedded in a greater sequence of control keys, but the store 18 will ignore those keys which do not refer to operations of the store 18 because they will find no match in the store.

The functions of the stores 19*a*, 19*b*, . . . 19*n* is to attempt to match the bit patterns from the common data bus 21 with tables stored in these stores and, when the bit string is exhausted, to gate the data addressed by these evaluations onto the common data bus 21 as the output from the recognition stage. This is achieved by performing an associative search in each store using as the address the bit pattern, the control key transmitted with the bit pattern and a control key from the CTU 17. Further control keys control the read out. The stores 19*a*, 19*b*, . . . 19*n* will ignore control keys which relate only to the store 18 as these keys will find no match in the stores 19*a*, 19*b*, . . . 19*n*.

In its simplest form, the recognition is performed by finding a unique match in one of the stores 19*a*, 19*b*, . . . 19*n*, but this implies using larger stores than are really necessary. Since the three state functional memory units can AND and OR results, partial bit strings only need be matched and a composite output generated by gating out the logical combination of the data identified by the total matches found, such data cancelling if in conflict or producing significant results if not.

Further, any of the following alterations are possible:

a. Additional stores 19*n*+1, etc. can be added to the recognition stage to increase the number of patterns to which the stage is responsive. This is a matter of simple electrical and physical connection and, in general, no change is required to the data bus system, to the CTU 17 nor to the store 18 since the added store can be made responsive to existing control keys by entering appropriate tables therein.

b. Any store 19*a*, 19*b*, . . . 19*n* can be extended, if required, by adding an additional store $19a_2$, $19b_2$, etc., as the case may be, connected to the CTU 17 by a private path to the store 19*a*, 19*b*, etc. it extends, and to the common data bus 21. The same effect could be achieved by having stores of varying sizes but there are manufacturing advantages in maintaining uniform store size.

c. The size of the tables in the stores 19*a*, 19*b*, . . . 19*n* can be reduced by including a common feature or zone store connected to the CTU 17 and to the common data bus. This store, functioning in the same way as any of the stores 19*a*, 19*b*, . . . 19*n*, can be arranged to respond to features common to patterns and to supply its response to the stores 19*a*, 19*b*, . . . 19*n* at the appropriate times in a cycle. Thus the stores 19*a*, 19*b*, . . . 19*n* do not need to recognize these features, but by only the appropriate outputs of the zone store.

d. The recognition stage can have a parallel input in which case the store 18 can be simplified or even dispensed with.

e. A buffer store can be included on the input to the recognition stage to cope with a fluctuating data input rate and this store can be used to perform some of the functions of the store 18.

f. The store 18 could be replaced by a shift register with a selectably gated output but this seems to have few advantages to recommend it.

g. The stores 18 can be arranged to regenerate the bit string at the end of a recognition cycle. Thus, if no pattern has been recognized, the scan of the input stage can be shifted by one, two or more adjacent bit positions, and a fresh recognition cycle performed.

h. Each store 18, 19*a*, 19*b*, . . . 19*n*, the zone store and additional stores if any could have individual control units with a common timing circuit.

i. The CTU 17 of the individual control units could be functional memory units addressed by a binary clocking counter for example.

j. Two state associative stores can be used but the sizes required in given circumstances will be greater than the sizes of the three state stores needed to perform the same function and will be slower.

Figure 3:
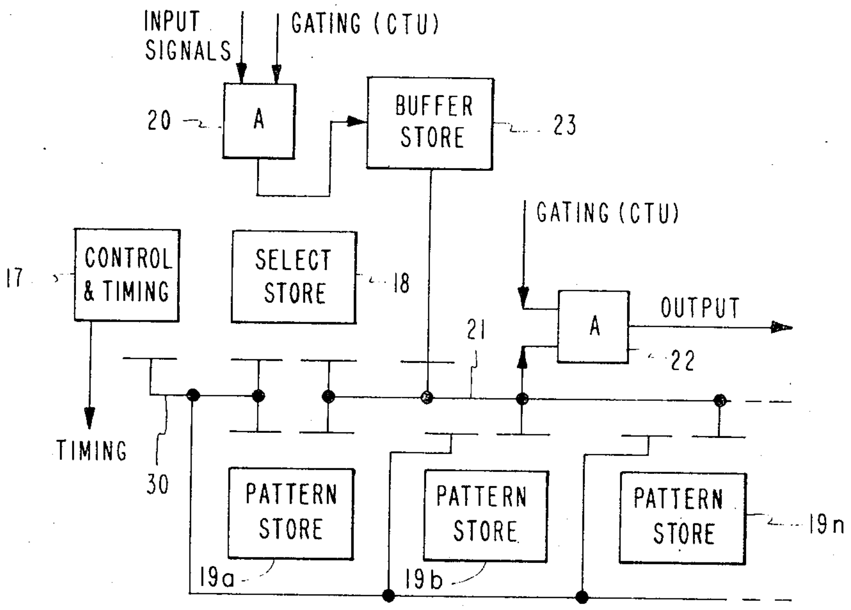
FIG. 3 is a diagram of another form of optical character reader according to the present invention.

FIG. 3 illustrates the stage of FIG. 2 modified by inclusion of a buffer store 23 bypassing the store 18.

Figure 4:
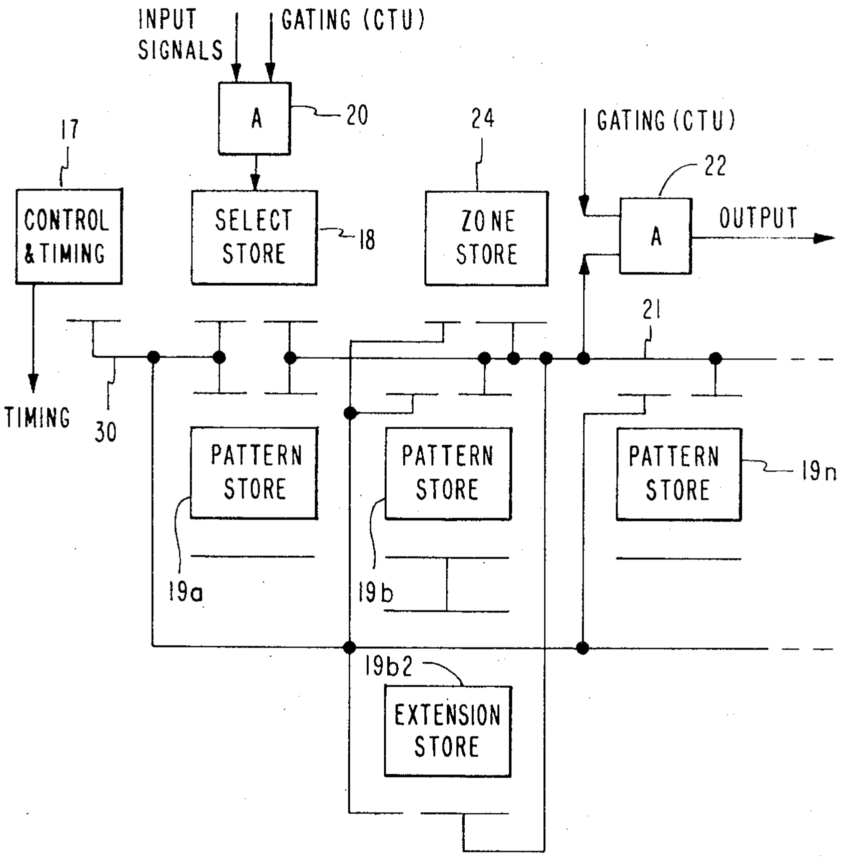
FIG. 4 is a diagram of another form of optical character reader according to the present invention.

FIG. 4 illustrates the stage of FIG. 2 modified by the inclusion of a zone store 24 and an extension store 19*b*2 extending store 19*b*.

Although the embodiments described are optical character reading systems, the invention applies to any system for recognizing the existance of a particular pattern embedded in a greater pattern or on its own, whether in analog or digital form.

Having described several preferred embodiments thereof, I claim as my invention:

1. A pattern recognition system, comprising:

input means for reducing an input pattern to a string of digits;

a group of associative memory units of the type which compares an applied digit string with portions of stored data words to provide signals indicative of matches therebetween, each unit being adapted to contain a plurality of data words corresponding to a different reference pattern, and to provide characteristic signals indicative of matches between preselected portions of said digit string and said data words;

distribution means for transmitting said digit string in parallel to said associative memory units in said group; and output means coupled to said group of associative memory units for collecting and gating said match signals.

2. A system according to claim 1, wherein each said associative memory unit has a plurality of data cells each having at least three states for storing said data words, means for selecting said digit-string portion, and means for comparing the digits of said selected portion with at least two of said three cell states.

3. A system according to claim 2, further comprising at least one additional associative memory unit and a private data bus coupling said additional unit to one unit of said group of associative memory units.

4. A system according to claim 2, further comprising control means coupled in parallel to said associative memory units in said group for issuing a predetermined sequence of control keys to said units.

5. A system according to claim 4 wherein said control means comprises a read-only memory unit adapted to contain representations of said control keys.

6. A system according to claim 2, further comprising a zone store responsive to said digit string, said zone store being adapted to contain a plurality of data words representing a plurality of reference features, said zone store being further adapted to provide characteristic signals indicative of matches between preselected portions of said digit string and said last-named data words, and to communicate said last-named signals to said group of associative memory units.

7. A system according to claim 6, wherein said zone store comprises an associative memory unit having a plurality of data cells each having at least three states.

8. A system according to claim 7, wherein said zone store is coupled to said distribution means for receiving said digit string and for transmitting said last-named characteristic signals in parallel to said associative memory units in said group.

9. A system according to claim 7, further comprising control means coupled in parallel to said associative memory units in said group for issuing a predetermined sequence of control keys to said units.

10. A system according to claim 9, wherein said control means is further coupled to said zone store for issuing said key sequence thereto.

11. A system according to claim 2, wherein said distribution means comprises a common data bus for transmitting said digit string from said input means to said group of associative memory units.

12. A system according to claim 11, wherein said distribution means further comprises a select store for selectively gating portions of said digit string to said group of associative memory units.

13. A system according to claim 12, wherein said select store comprises an associative memory unit having a plurality of data cells each having at least three states.

14. A system according to claim 13, further comprising control means coupled in parallel to said associative memory units in said group for issuing a predetermined sequence of control keys to said units.

15. A system according to claim 14, wherein said control means is further coupled to said select store for issuing said key sequence thereto.

16. A system according to claim 13, wherein said select store is coupled between said input means and said common data bus.

17. A system according to claim 13, wherein said input means is coupled to said common data bus, said select store being coupled to said data bus for receiving said digit string from said input means and for transmitting said gated digit-string portions to said group of associative memory units.

* * * * *